UNITED STATES PATENT OFFICE.

BRUNO TRENCKMANN, OF BERLIN, GERMANY.

MANUFACTURE OF LEATHER.

SPECIFICATION forming part of Letters Patent No. 653,830, dated July 17, 1900.

Application filed June 22, 1900. Serial No. 21,231. (Specimens.)

*To all whom it may concern:*

Be it known that I, BRUNO TRENCKMANN, a citizen of the Empire of Germany, residing at Berlin, in the Empire of Germany, have invented certain new and useful Improvements in the Manufacture of Leather; and I do hereby declare the following to be a full, clear, and exact description of the invention, such as will enable others skilled in the art to which it appertains to make and use the same.

This invention relates to the art of making leather; and its object is to produce a leather which combines with great strength and toughness of fiber great thinness and a minimum of weight, so as to make the same applicable for purposes for which leather could not heretofore be employed.

With these objects in view a process embodying my invention involves the treatment of the outer peritoneal coating or serous membrane of the intestines, preferably the cæcum or blind gut of a bovine animal—such as the ox, bull, steer, cow, &c., preferably of the ox—which is the same membrane that is employed as gold-beaters' skin in the art of making gold-leaf. This membrane is under my invention first degreased, then treated with a soap solution, and then tanned or tawed. My invention also involves such further steps in the further treatment and finishing of the leather made from the membrane and such special features as will be hereinafter set forth, and pointed out in the claims.

I will now describe in detail what I consider the preferable manner of carrying my invention into effect.

I employ as starting material the outer peritoneal coating of the cæcum or blind gut of the ox, the same material which is used as gold-beaters' skin in the art of making gold-foil. This membrane is now removed from the intestine which it envelops in most slaughtering establishments in the United States and in Germany and supplied in this condition to the manufacturers of gold-beaters' skins or to gold-beaters. In order to convert this delicate membrane into leather, I first remove all fatty substances and adhering impurities therefrom by the following treatment: The membranes are first rinsed in warm water, preferably in three graded baths, each having a higher temperature than the preceding one. I attain the best results by making the temperature of the first bath 25° centigrade, that of the second 30° centigrade, and that of the third 35° centigrade. Thereupon the membranes are immersed and left for about five minutes in a bath composed for one hundred membranes of ten grams permanganate of potassium dissolved in three liters of water and having a temperature of about 27° centigrade. Thereupon the membranes are placed into a bath of twenty grams of sulfurous acid dissolved in three liters of water and having a temperature of substantially 27° centigrade. In this bath the membranes or skins must be left until they have swelled up and attained a pure-white color, whereupon they are taken out and again submitted to three rinsings in warm water of 25°, 30°, and 35° centigrade, successively, as above. The membranes are now ready to be immersed into a soap solution or bath, which is preferably prepared by boiling about one-half kilogram of good pure-white toilet soap, such as white castile-soap, in one and one-half liters of water for one hundred membranes, the said soap-bath having been first reduced in temperature to 35° centigrade by the addition of one-half liter of cold water. In this soap-bath the membranes remain for several hours until the soap has been completely absorbed, whereupon the membranes are introduced successively into two baths of warm water having a temperature of about 27° centigrade for the purpose of completely rinsing or washing the same. The membrane are now ready for the tanning or tawing process, which is as follows: A solution is prepared by dissolving for each one hundred membranes one hundred grams chromic acid and fifty grams of alum in one liter of water of 35° centigrade. The membranes are placed in a bath of warm water, preferably one liter of water of 27° centigrade. The chromic-acid solution is added to the membranes in the warm-water bath gradually while agitating or stirring the membranes. Preferably the following course is pursued: First, about one-eighth of the chromic-acid solution is added to the membranes, then after about ten minutes a further one-eighth of the same is added, and after a further ten minutes one-fourth of the original amount of the chromic solution is added, and, finally, after twenty minutes the balance of the chromic bath is poured into the bath containing the membranes. In this final bath the membranes are allowed to remain for one hour, while being constantly agitated or stirred. The membranes are then removed from the tawing-bath and rinsed twice successively with warm water of the temperature of 27° centigrade. This completes the tanning or tawing process; but I find it advantageous to immerse the tanned membranes in a bath composed of five hundred grams of yolk of eggs and one hundred grams of glycerin added to two liters of water and thoroughly mixed with the same. In this bath the tanned membranes are to remain about ten hours. Thereupon they are removed and drained by hanging them over or from lines or ropes, whereupon they are placed on suitable frames or supports and allowed to dry. After they have thus lain for about eight days they are stored in moderately-damp chambers or inclosures and are then drawn over crescent-shaped blunt knives over their entire surface until smooth and pliable, or any known or desired smoothing manipulation may be employed for this purpose. The leather is now completed and may be used in this condition; but for many purposes it may be found desirable to further finish or embellish the same. It is susceptible of being dyed in beautiful colors, and for this purpose it may be immersed in a bath containing the desired dye, such as anilin dye, in quantities governed by the color to be imparted. A bath containing from three to five per cent. dye will usually answer. To this bath a mordant consisting of four cubic centimeters of acetic acid of fifty-per-cent. strength is added. In the bath so prepared the leather is to remain for several hours and agitated.

The leather, whether dyed or undyed, may be still further finished by passing the same through calendering-rolls. In some cases I may sprinkle or dust over the dyed leather colored talcum powder and then calender the same. It is also desirable in some cases to coat the undyed leather with a thin film of a composition prepared by mixing eight parts collodium, one part castor-oil, and one part caoutchouc solution. Leather so coated is particularly adaptable for gloves, accordion-bellows, balls, and the like.

When it is desired to obtain a thicker and stronger leather which, however, is not so well adapted to be dyed, I may use instead of the chromic tanning-bath above described a bath which for one hundred membranes consists of one hundred grams of sulfate of zinc, forty grams of alum, and fifty grams of wheat-flour properly mixed with one liter of water, the other conditions and steps of the tanning or tawing process remaining the same as above. This treatment results in a pure-white lusterless leather of greater body than under the chromic-acid treatment.

The new leather prepared according to the above process is covered by the claims in my application for Letters Patent, Serial No. 736,531, filed November 10, 1899, and is therefore not herein claimed. The process herein described is, however, an improvement on that set forth in that application.

What I claim, and desire to secure by Letters Patent of the United States, is—

1. The process of making leather which consists in first immersing the intestinal coating set forth, in a dilute sulfurous-acid bath until it has swelled and become white, then into a soap-bath and finally in a mineral tanning-bath.

2. In the process of making leather from the intestinal coating or membrane set forth, the process which consists in first submitting the membrane to the action of a permanganate-of-potassium bath, then to the action of a bath of dilute sulfurous-acid bath.

3. In the process of making leather from the intestinal coating or membrane as set forth, the process which consists in first submitting the rinsed membrane to the action of a permanganate-of-potassium bath, then to the action of a dilute sulfurous-acid bath until it has swelled and become white and then to the action of a soap-bath.

4. The process of making leather from the intestinal coating or membrane as set forth, which consists in first cleansing the membrane to free it of fatty and foreign matters, and finally introducing it into a mineral tanning-bath.

5. The process of making leather from the intestinal coating or membrane as set forth, which consists in first cleansing the membrane to free it of fatty and foreign matters then immersing it in a soap-bath, and finally into a mineral tanning-bath.

6. The process of making leather from the intestinal coating or membrane as set forth, which consists in first immersing the rinsed membrane in a warm dilute bath of permanganate of potash, then in a warm dilute sulfurous-acid bath, then in a warm soap-bath, and finally treating it with a mineral tanning-bath, which is added gradually to that containing the membranes.

7. The process of making leather from the intestinal coating or membrane as set forth, which consists in first submitting the membrane to a cleansing, bleaching and swelling bath, then treating it with a warm soap-bath, and then treating it with a warm mineral tanning-bath which is gradually strengthened.

8. The process of making leather from the intestinal coating or membrane as set forth, which consists in first rinsing the membrane and then immersing it in a warm dilute permanganate-of-potassium bath, then whitening and swelling it by immersing it in a warm dilute sulfurous-acid bath, then treating it with a warm soap-bath and then placing the membrane into a bath of warm water and then adding to the same gradually a chromic-acid solution.

9. The process of making leather from the intestinal coating or membrane as set forth, which consists in first rinsing the membrane and then immersing it in a warm dilute permanganate-of-potassium bath, then whitening and swelling it by immersing it in a warm dilute sulfurous-acid bath, then treating it with a warm soap-bath, then placing the membrane into a bath of warm water, adding to the same gradually a chromic-acid solution, and finally immersing the membrane in a bath composed of yolk of egg, glycerin and water.

10. The process of making leather which consists in treating the peritoneal intestinal membrane or coating as set forth with a tanning-bath.

In testimony whereof I affix my signature in presence of two witnesses.

BRUNO TRENCKMANN.

Witnesses:
M. C. MASSIE,
ANTON A. GLOETZNER.